Aug. 9, 1949.  L. L. SALFISBERG  2,478,505
MACHINE AND METHOD FOR PACKAGING
AND CRUSHING TABLETS
Filed Jan. 30, 1946
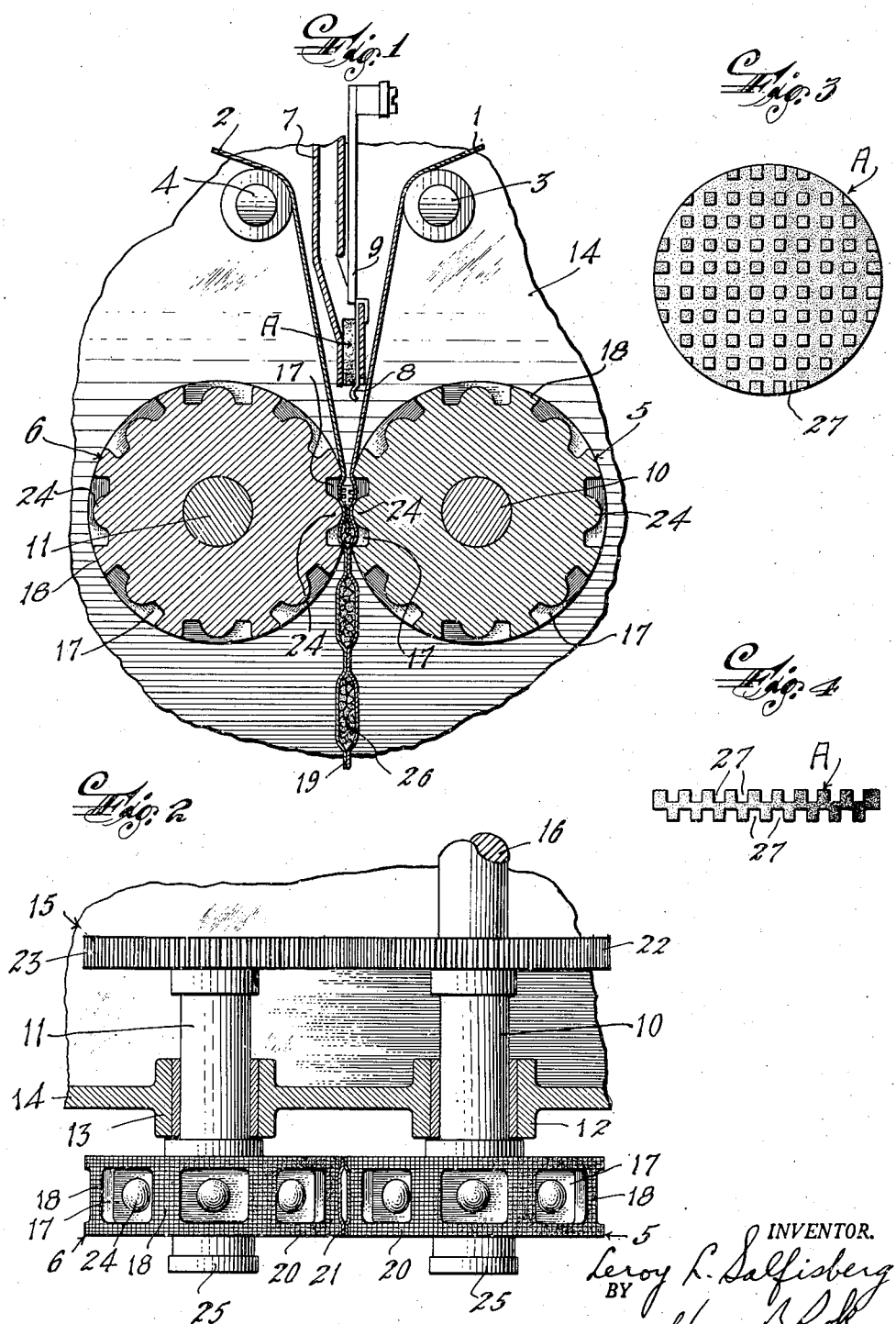
INVENTOR.
Leroy L. Salfisberg,
BY
Harry Brook,
ATTORNEY Patented Aug. 9, 1949

2,478,505

UNITED STATES PATENT OFFICE 2,478,505

MACHINE AND METHOD FOR PACKAGING AND CRUSHING TABLETS

Leroy L. Salfisberg, South Orange, N. J., assignor to Ivers-Lee Company, Newark, N. J., a corporation of Delaware Application January 30, 1946, Serial No. 644,370

4 Claims. (Cl. 93—3)

The invention relates to the packaging or wrapping of articles in containers formed of sheet material, for example, paper, "cellophane," "Pliofilm" and especially sheet material which itself is thermoplastic and can be softened by heat or has a thermoplastic or fusible coating whereby overlapping layers of the material can be fused or caused to adhere together by application of heat and pressure to form a seal.

The invention is directed particularly to crushing articles in such containers and a prime object of the invention is to provide a novel and improved method of and apparatus for crushing such articles after they have been deposited between juxtaposed layers of the packaging material.

Another object is to provide apparatus of this character that is simple in construction, inexpensive to manufacture and highly efficient in operation.

Another object is to provide a tablet of novel construction for facilitating the crushing thereof.

Other objects, results and advantages of the invention will be brought out by the following description in conjunction with the accompanying drawing in which—

Figure 1 is a fragmentary sectional view of the center portion of a machine embodying my invention.

Figure 2 is a top plan view of the rollers shown in Figure 1.

Figure 3 is an enlarged top plan view of a tablet adapted to be used with the improved machine and formed to facilitate crushing, and Figure 4 is an edge view of the tablet of Figure 3.

Specifically describing the illustrated embodiment of the invention, the packaging material is fed in the form of strips 1 and 2 from a pair of supply rolls such as shown in my Patent No. 2,083,617. The packaging material may be for example chlorinated rubber otherwise known as "Pliofilm," or "cellophane" having a thermoplastic coating on one side thereof or other suitable material. The strips pass over guide rollers 3 and 4 past the article feeding and depositing mechanism including crimping and sealing rollers 5 and 6 and may thence pass to a severing mechanism (not shown).

The feeding and depositing mechanism may be such as shown in my Patent No. 2,083,617 or in my copending application Serial No. 560,306 filed October 25, 1944, which has matured into Patent Number 2,420,982, dated May 20, 1947, including a commodity releasing structure positioned directly above the intersection of the two rollers 5 and 6. This structure includes a chute 7 containing the articles A and a spring 8 to retain the tablets in the chute and to prevent the endmost tablet in line from falling. A plunger member 9 intermittently operable in timed relation to rotation of the rollers 5 and 6, is provided for pushing the tablets in succession past the spring 8 and out of the chute 7 so that they may fall downwardly between the rollers.

The strips of packaging material are fed or drawn from the supply rolls under tension by the crimping rollers 5 and 6. These rollers are fastened to shafts 10 and 11, respectively, which are rotatably mounted in bearings 12 and 13, respectively, in a wall 14 of the frame 15 of the machine. Shaft 10 is connected to a drive shaft 16 which is operatively connected to a suitable source of power. The rollers have complemental registering recesses 17 to provide a clearance space between them for the tablets A between the layers 1 and 2, the recesses being spaced circumferentially of the rollers. Between the recesses 17, the peripheries of the rollers have circumferential and transverse grooves or other suitable roughened or serrated surfaces 18 for transversely crimping or corrugating and pressing together the layers 1 and 2 as at 19 between two adjacent tablets, and at their ends corresponding to the free edges of the layers 1 and 2, the rollers are formed with suitable peripheral serrated or roughened surfaces 20 to press together and crimp or corrugate the longitudinal edge portions of the layers as at 21.

To effect the complementary rotation of the rollers, the shafts 10 and 11 are provided with gears 22 and 23, respectively, as shown in Figure 2. These two gears engage each other so as to cause the rotation of the rollers in timed relationship with respect to other moving parts of the packaging machine and with respect to each other in a manner such that the recesses 17 coincide with each other as the rollers are rotated in opposite directions.

When the material of the package is heat sealable, the rollers may be heated by any suitable electrical heating devices 25 such as shown in my Patent No. 2,180,966 for heating the packaging material or the thermoplastic coating thereon at the same time that pressure is applied to the layers by the serrated surfaces 20 and 21 of the rollers.

According to the present invention, while the tablet is being enclosed and sealed within the package, it is crushed to a granular condition. For this purpose, the base of each recess 17 is formed with a centrally disposed solid projecting member 24, preferably having a rounded outer end. These members project only sufficient to provide a space between the opposed members 24 which is less in width than the thickness of the tablet.

In packaging the tablets, the rollers 5, 6 pull the strips 1 and 2 from suitable supply rolls and the transverse and peripheral crimping surfaces 18 and 20 respectively seal said strips together in transverse and longitudinal marginal zones to form compartments for the tablets. Immediately after each transverse sealed zone is formed, a tablet is pushed from the chute 7 into the space between said strips 1 and 2 and above said transverse zone. Preferably the plunger 9 follows the tablet to hold it in position between said strips for a time until the continued rotation of the rollers causes a sufficient closing of the compartment around the tablet to prevent displacement of the tablet, whereupon the plunger is withdrawn to its normal position. Continued rotation of the rollers then causes a complete sealing of the packaging material around the tablet.

Simultaneously with the sealing of the longitudinal edges of the strips 1 and 2, the projecting members or crushing studs 24 squeeze between them through the strips 1 and 2, the tablet that is located in the recesses 17 that are in register between the rollers, the flexible strips yielding under the pressure imposed by the studs 24. The tablet is thereby crushed into small pieces or granules as indicated at 26 in Figure 1.

From the crimping and crushing rollers, the strip carrying the tablets is fed to a severing or shearing mechanism of any suitable constructions.

The tablet A to be packaged and crushed is shown as a circular formed of powdered material which may be grooved or scored on opposite faces as at 27 to facilitate crushing thereof. This grooving or scoring also provides a maximum of surface area for contact with liquid to expedite solution of the tablet should it be used without crushing.

If desired the tablets may first be enclosed between the layers of packaging material, for example by rollers like the rollers 5 and 6 but not having the studs 24, and thereafter the package strip could be passed through other means, e. g., rollers having studs like the studs 24, for the purpose of crushing the tablets.

What I claim is:

1. A tablet packaging and crushing apparatus comprising a pair of rotative elements having alternate recesses and crimping surfaces, such elements being mounted for rotation with the recesses and crimping surfaces coming into respective mutual engagement in rotation, means for feeding opposed layers of packaging material between such rotative elements and means for feeding tablets between said layers, said rotative elements having devices for crushing the tablets between said layers.

2. In a packaging machine, means for supplying layers of packaging material in spaced opposed relation to each other, means for depositing a material to be packaged between said layers, a pair of opposed parallel rotatable rollers having recesses in their peripheries for receiving said layers and the material therebetween, said rollers having crimped surfaces surrounding said recesses for crimping and encasing said material between said layers and projecting members formed centrally of said recesses for crushing the material partially encased between the layers.

3. The steps in a method of packaging articles consisting in continuously feeding opposed strips of packaging material convergingly downwardly, inserting an article between said strips, sealing said strips together transversely at their meeting point below the article and along their longitudinal edges and simultaneously crushing the article between said strips and lastly sealing the strips transversely above the article.

4. In a packaging machine, means for supplying layers of packaging material in spaced opposed relation to each other, means for depositing material to be packaged between said layers, and means for simultaneously pressing said layers together with said material between them and crushing said material, including a pair of opposed parallel rotatable rollers having recesses in their peripheries for receiving said layers and said material therebetween, said rollers having projecting members in said recesses to exert pressure on said layers for crushing the material therebetween, and means for rotating said rollers in opposite directions.

LEROY L. SALFISBERG.

REFERENCES CITED

The following references are of record in the file of this patent:

UNITED STATES PATENTS

| Number | Name | Date |
|---|---|---|
| 1,728,969 | Hoodless | Sept. 24, 1929 |
| 1,971,485 | Hosmer | Aug. 28, 1934 |
| 2,083,617 | Salfisberg | June 15, 1937 |
| 2,424,103 | Lobley et al. | July 15, 1947 |
| 2,447,258 | Lobley et al. | Aug. 17, 1948 |